United States Patent
Deubler et al.

(10) Patent No.: US 10,270,317 B2
(45) Date of Patent: Apr. 23, 2019

(54) MOTOR TEMPERATURE MONITORING

(71) Applicant: ebm-papst Mulfingen GmbH & Co. KG, Mulfingen (DE)

(72) Inventors: Stefan Deubler, Krautheim-Unterginsbach (DE); Thomas Heli, Langenburg (DE); Walter Hofmann, Mulfingen-Ailringen (DE); Helmut Lipp, Doerzbach-Hohebach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 185 days.

(21) Appl. No.: 15/154,079

(22) Filed: May 13, 2016

(65) Prior Publication Data

US 2016/0380518 A1    Dec. 29, 2016

(30) Foreign Application Priority Data

Jun. 29, 2015    (DE) .................. 10 2015 110 399

(51) Int. Cl.
| | | |
|---|---|---|
| *H02K 11/25* | (2016.01) | |
| *H02H 7/085* | (2006.01) | |
| *G01K 1/12* | (2006.01) | |
| *G01K 1/14* | (2006.01) | |
| *H02H 7/08* | (2006.01) | |

(52) U.S. Cl.
CPC ............ *H02K 11/25* (2016.01); *G01K 1/12* (2013.01); *G01K 1/14* (2013.01); *H02H 7/0833* (2013.01); *H02H 7/0852* (2013.01)

(58) Field of Classification Search
CPC . G01K 1/12; G01K 1/14; H02K 11/25; H02H 7/0852

USPC ........................................................ 310/68 C
See application file for complete search history.

(56) References Cited

U.S. PATENT DOCUMENTS

| | | | | | |
|---|---|---|---|---|---|
| 3,875,439 | A | * | 4/1975 | Roach ................. | H02K 11/25 310/68 C |
| 5,829,880 | A | * | 11/1998 | Diedrich .............. | G01K 13/02 374/208 |
| 2007/0110124 | A1 | * | 5/2007 | Shiraki ................ | G01K 1/08 374/208 |
| 2012/0112581 | A1 | * | 5/2012 | Maekawa ............ | H02K 3/522 310/71 |
| 2013/0320817 | A1 | * | 12/2013 | Marschall .......... | H02K 11/0094 310/68 C |

OTHER PUBLICATIONS www.engineeringtoolbox.com/thermal-conductivity-metals-d_858.html.*
https://contractorexamschools.com/seminars/electrical-crash-course-ece-certification/.*

* cited by examiner

*Primary Examiner* — Terrance L Kenerly
(74) *Attorney, Agent, or Firm* — Harness, Dickey & Pierce, P.L.C.

(57) ABSTRACT

The disclosure relates to a temperature monitoring assembly for monitoring the windings of a motor, comprising at least one temperature sensor or thermal circuit breaker arranged outside of and spaced from the windings of the motor, and at least one heat conducting component, which extends from a first component section for heat coupling and heat transfer, which is in contact with or adjacent to the windings, to a second component section for heat coupling and heat transfer, on or adjacent to the temperature sensor.

Figure 1:
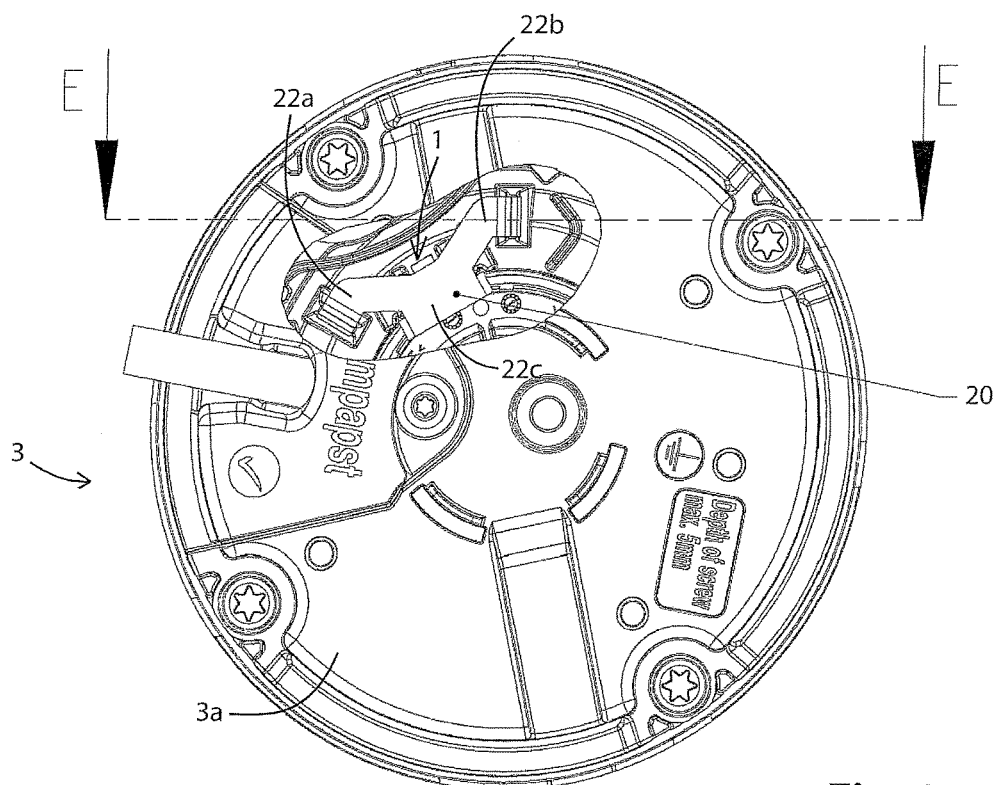

8 Claims, 2 Drawing Sheets

MOTOR TEMPERATURE MONITORING

CROSS-REFERENCE TO RELATED APPLICATIONS

This application claims the benefit and priority of DE 10 2015 110 399.0, filed Jun. 29, 2015. The entire disclosure of the above application is incorporated herein by reference.

FIELD

The present disclosure relates to a temperature monitoring assembly for monitoring a winding of a motor, and a motor that comprises such a temperature monitoring assembly.

BACKGROUND

This section provides background information related to the present disclosure which is not necessarily prior art.

In electric drives and motors, the occurrence of heat losses in the motor is practically unavoidable. Electric motors therefore have an upper temperature limit, and whenever this limit is exceeded, the motor may become damaged or may malfunction, e.g. due to a failure of the winding insulation.

Operating failures of a drive unit or of the electric motor itself can result in excessively high temperatures in the electric motor. Such failures can occur when the machine is operating under high loads, such as with sluggishness or e.g. a blockage of the mechanism. Clogged ventilation grids in an electric motor can also result in undesirable increases in temperature. When the motor winding exceeds the permissible temperature, the electric motor becomes damaged, which may result in a failure of the machine as a whole. It is therefore necessary to monitor the winding temperature in order to protect the electric motor against overheating.

Furthermore, when designing the motor, a compromise must be made between overall dimensions and load torque. Particularly if the motor will be operated nearly constantly below its nominal torque with only brief load peaks occurring above this level, it makes economic sense to design the motor based not on the load peaks but on the projected average value, plus a safety margin. To avoid unnecessary oversizing, it is also necessary to ascertain the motor temperature or in any case to monitor the upper temperature limit.

From unexamined application WO 93/23904 A1 a method for monitoring an electric motor for thermal overloading is known, the object of which is to minimize the technical expenditure and the overall dimensions of the overload protector for the electric motor. To accomplish this, while the electric motor is switched on, the motor power loss or a value that is proportional thereto is calculated based on measured motor data and is then integrated. The integration value is compared with a predetermined threshold value, and when the integration value exceeds a limit for the threshold value, the electric motor is shut off. According to this known method, the actual winding temperature can be ascertained only approximately, and environmental factors, which are co-responsible for the temperature behavior of the electric motor, are disregarded.

In other known methods that likewise do not involve a temperature sensor, the current that is drawn by the electric motor is monitored. If the motor current exceeds the permissible continuous current for an extended period of time, the motor will be shut off by means of a motor protection switch, or in the case of adjustable speed three-phase motors by means of the frequency converter.

Further known methods for protecting an electric motor against overheating involve temperature measurement by means of a temperature sensor, which in most cases is housed in the motor winding. With known embodiments of motors that have overmolded stators, for example, thermal circuit breakers are inserted into the winding prior to the overmolding process and the terminal slots are connected to a circuit board. If the temperature near the motor winding, ascertained in this manner, reaches a predetermined maximum permissible threshold value, this will also trigger a shut off of the electric motor. One method of this type is known from unexamined application DE 199 39 997 A1, the stated object of which is to improve the overload protection of the electric motor particularly with respect to its time characteristic. For this purpose, a signal processor is provided, which generates a corrected temperature signal based on the output signal and at least one past output signal from the temperature sensor.

The devices and methods known from the prior art have a number of disadvantages that lead to problems in practical use. When a temperature sensor is used, an adequate insulating layer is required for electric insulation between the sensor and the winding. This insulating layer also acts as a thermal insulator, and therefore there is a difference in temperature between the electrically active part of the winding and the temperature sensor, particularly in cases of overloads that involve high currents. The result is a delayed shut-off of the electric motor when the motor winding is already overheated. This effect is intensified when the electric insulation must meet increased requirements for the protection of persons. Moreover, when a temperature sensor is installed in the winding, the temperature can be detected at only a single location on the winding.

Particularly when a frequency converter is operated at low infeed frequencies, radically different heating of the winding parts can occur. In this case, the hottest point on the winding, where overheating is already occurring, cannot be reliably determined. The capacitive coupling between the temperature sensor and the motor winding is also problematic particularly in the case of frequency-controlled motors, since coupling currents are transmitted via the temperature sensor line.

Furthermore, integrating a thermal detector or sensor into the winding involves high assembly cost and the need for an early shut off of the motor in the event of a fault, due to the significant temperature difference between the affected winding and the circuit board, which in turn leads to load problems with the motor due to insufficient capacity utilization.

It is therefore the object of the present disclosure to overcome the aforementioned disadvantages by providing an assembly and a method for monitoring the temperature of an electric motor which can be implemented cost-efficiently, reduces the overall cost of assembly and also improves the capacity utilization of the motor, and will reliably detect excess temperatures in the windings of an electric motor so that the motor can be shut off in time in the event of or prior to a thermal overload.

This object is attained by a temperature monitoring assembly and by a motor having such a temperature monitoring assembly.

The basic concept of the disclosure is to conduct the generation of heat and therefore the temperature as a relevant measured variable directly from or from the vicinity of the surface of the motor windings to a sensor by means of a heat transfer medium, which is coupled for the purpose of transferring heat. The sensor can preferably be arranged on an integrated circuit board, e.g. a printed circuit board of the motor.

SUMMARY

This section provides a general summary of the disclosure, and is not a comprehensive disclosure of its full scope or all of its features.

According to the disclosure, a temperature monitoring assembly for monitoring the windings of a motor is therefore provided, comprising at least one temperature sensor, thermal circuit breaker or suitable temperature detector, arranged outside of and spaced from the windings of the motor, and at least one heat conducting component, which extends from a first section of the component for heat coupling and heat transfer, which is in contact with or adjacent to the windings, to a second section of the component for heat coupling and heat transfer, located on or adjacent to the temperature sensor.

In a preferred embodiment of the disclosure, it is provided that the heat conducting component is a heat conducting plate (hereinafter shortened to: conductive plate), preferably a conductive plate which is adapted to the specific geometry of the motor windings.

The conductive plate is more preferably embodied as a metallic stamped and bent component. Even more preferably, the heat conducting component has a thermal conductivity of $\lambda > 200$ W/(m K) so as to enable rapid temperature detection.

In a preferred embodiment of the disclosure, a mounting device is further provided, into which the first section of the heat conducting component (for thermal coupling to the windings) is inserted.

Advantageously, the first section of the heat conducting component is embodied as a section of the heat conducting component that is bent into substantially a V-shape, with the mounting device being correspondingly provided with a V-shaped recess. Such an embodiment enables two adjacent motor windings to be thermally "bridged", i.e. monitored simultaneously by means of a common conductive plate.

It is therefore further preferable for the V-shaped section of the heat conducting component to extend into the space between two adjacent windings of the motor so that the temperature of the two windings can be monitored by a common sensor.

Advantageously, a thermally conductive film is positioned between the temperature sensor and the second section of the heat conducting component, with the film preferably directly covering the temperature sensor. It is further advantageous for the heat conducting component to have a base section, which is preferably directly above the heat conducting film to allow heat to be transferred from the coils via the film to the temperature sensor.

A further aspect of the present disclosure relates to an electric motor having windings to be thermally monitored, which is equipped with one or more temperature monitoring assemblies as described above.

Preferred is an embodiment in which a sensor mount is provided in the motor, on or relative to which a heat conducting component is mounted, with the heat conducting component being arranged with its first component section between the windings and with its second component section above the assigned temperature sensor.

Other advantageous enhancements of the disclosure are specified in the dependent claims or will be described in detail in the following description of the preferred embodiment of the disclosure, with reference to the figures.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
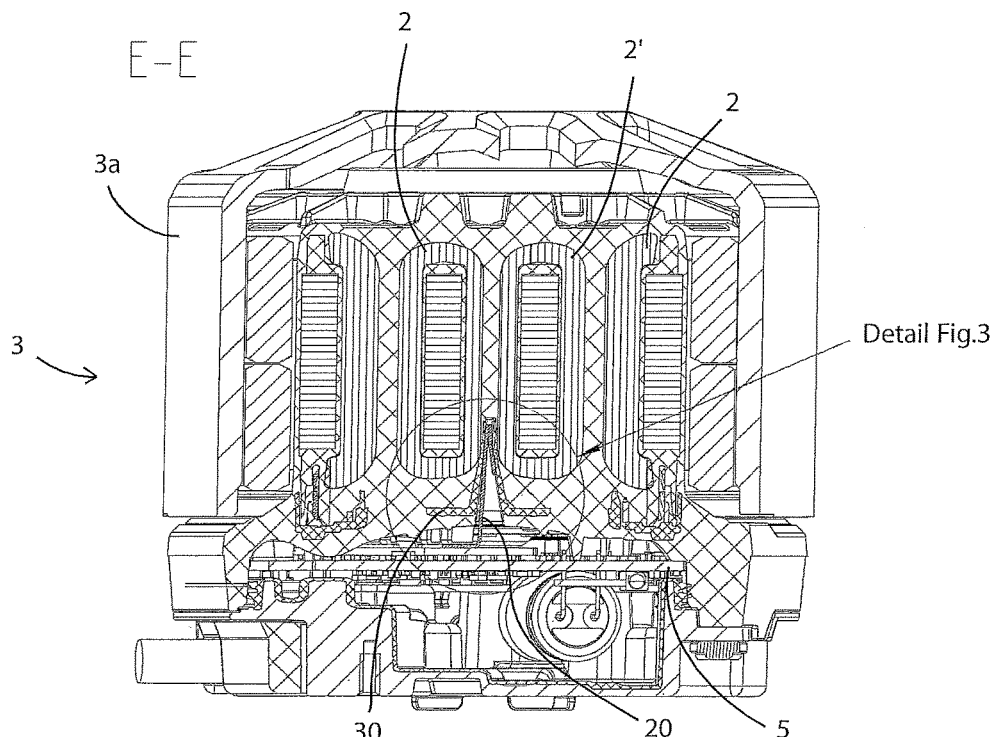

FIG. 1 a plan view of a motor that is equipped with a temperature monitoring assembly according to the disclosure;

FIG. 2 a sectional view along intersection line E-E according to FIG. 1, and

Figure 3:
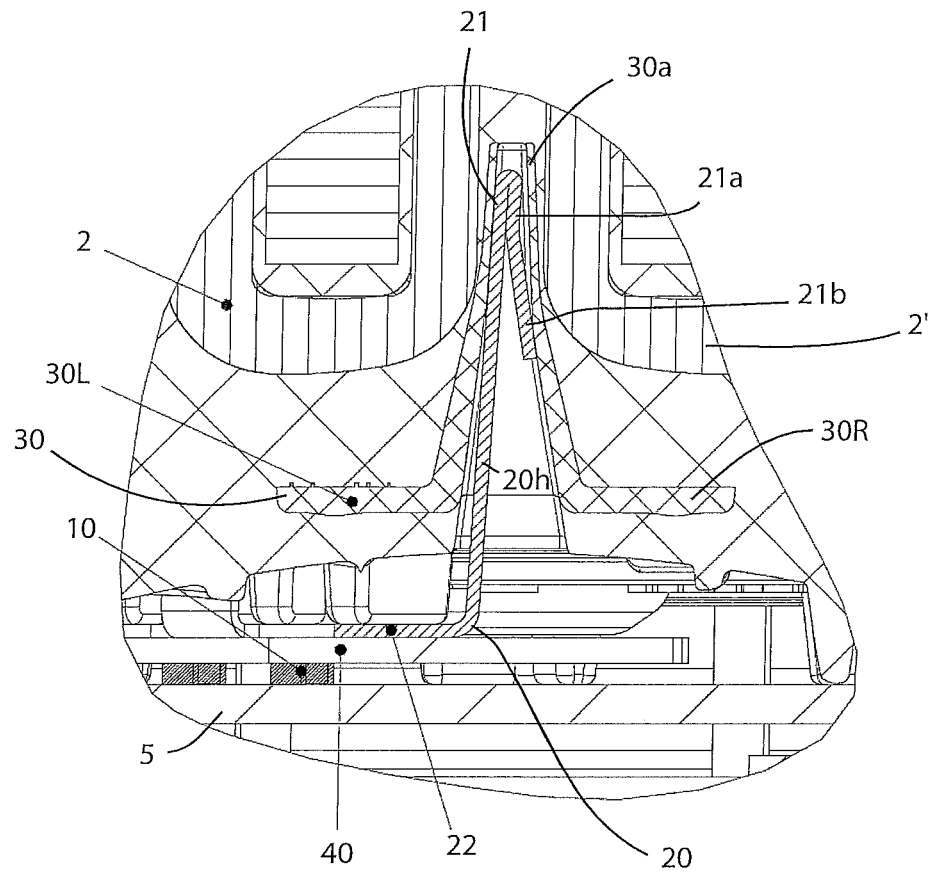

FIG. 3 a detail from FIG. 2.

Corresponding reference numerals indicate corresponding parts throughout the several views of the drawings.

DETAILED DESCRIPTION

Example embodiments will now be described more fully with reference to the accompanying drawings.

In the following, the disclosure will be described in reference to FIGS. 1 to 3 in the context of one embodiment example, in which the same reference signs are used to identify the same structural or functional features.

FIGS. 1 and 2 show a motor 3, which comprises a temperature monitoring assembly 1 for monitoring windings 2, 2' of motor 3.

FIG. 3 shows temperature monitoring assembly 1 in detail, which comprises a temperature sensor 10, arranged spaced from windings 2, 2' of motor 3, and a heat conducting component 20, with heat conducting component 20 extending from its first component section 21 for heat coupling and heat transfer, which is in contact with or adjacent to windings 2, 2', to a second component section 22 for heat coupling and heat transfer, on or adjacent to temperature sensor 10.

FIG. 1 shows motor 3 in a view from the bottom, with the selected form of representation showing housing 3a of motor 3 partially open so that heat conducting component 20 is visible. Heat conducting component 20 is embodied as a conductive plate. The conductive plate has a substantially Y-shaped lower two-armed section, in which a left arm 22a and a right arm 22b lead to a common connecting plate 22c. Each arm 22a extends bent at an angle of approximately 90° from a horizontal extension of the conductive plate into a vertical extension, with its end leading to component section 21, which is embodied as a section of the heat conducting component that is bent substantially in a V-shape, in other words conductive plate 20.

The vertical orientation of vertical section 20h of conductive plate 20 in relation to the horizontal orientation of plate-like section 22c of conductive plate 20 is clearly illustrated in FIG. 3.

It is further clear from FIG. 3 that the first (upper) component section 21 of conductive plate 20 is embodied as bent at an angle of approximately 180°, with a sub-section 21a thereof extending parallel to vertical section 20h and then section 21b thereof extending away from vertical section 20h.

As is further clear from FIGS. 2 and 3, a mounting device 30 is provided, which is embodied as a "plug-type mount" and which likewise has a funnel-shaped receptacle for insertion of the first component section 21, i.e. the component section that is bent in a V-shape.

As is clear from FIG. 1, a mounting device 30 is located between every two windings 2, 2', for the purpose of holding the respective first component section 21 formed by conductive plate 20 and bent into a V-shape. Based on the above-described geometry involving an end that is bent into a V-shape, section 21b interacts with vertical section 20h as a spring element, which is supported in a spring-mounted manner against the inner walls of retaining device 30 and is held there securely in position.

Since the conductive plate is attached with its component section 21 directly adjacent to windings 2, 2' of motor 3, the heat is transferred directly via vertical section 20h of conductive plate 20 to plate section 22c.

As is clear from FIGS. 2 and 3, temperature sensor 10 is mounted directly on conductive plate 5. With such a configuration, the sensor component can be positioned spaced from and outside of windings 2, 2' of motor 3, preferably together with the other components on the same conductive plate 5. The horizontally extending plate-like section 22c of component 20 is situated above temperature sensor 10. To achieve optimum thermal coupling to the likewise horizontally oriented sensor 10, a heat conducting film 40 is arranged between heat conducting component 20 and the upper side of temperature sensor 10. Heat conducting film 40 is embodied as an electrically insulating film 40.

Mounting device 30, which is embodied as a plug-type mount, is preferably produced as an injection molded plastic component made of an insulating material. In the upper section 30a of mounting device 30, located between windings 2, 2', the wall is much thinner than in the lower section of mounting device 30, which, as is apparent in FIG. 3, forms laterally extending arms 30L and 30R. In the present embodiment example, a heat conducting component has been made of a metal having a thermal conductivity of $\lambda > 200$ W/(m K), in order to achieve particularly good thermal conductivity and thereby enable temperature sensor 10 to rapidly detect any temperature increase in windings 2, 2'.

The disclosure is not limited to the preferred embodiment examples described above. Rather, a number of variants which apply the described solution to different types of embodiments are also possible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A temperature monitoring assembly for monitoring windings of a motor, comprising:
   at least one temperature sensor or thermal circuit breaker arranged outside of and spaced from the windings of the motor,
   and at least one heat conducting component which extends from a first component section for heat coupling and heat transfer which is in contact with or adjacent to the windings, to a second component section for heat coupling and heat transfer, on or adjacent to the at least one temperature sensor, wherein
   the at least one heat conducting component is a conductive plate, embodied as a metallic stamped and bent component that is folded back upon itself.

2. The temperature monitoring assembly according to claim 1, wherein the heat conducting component has a thermal conductivity of $\lambda > 200$ W(m K).

3. The temperature monitoring assembly according to claim 1, wherein a funnel-shaped mounting device is further provided, into which the first component section of the heat conducting component is inserted.

4. The temperature monitoring assembly according to claim 1, wherein the first component section of the heat conducting component is embodied as a section of the heat conducting component that is bent substantially into a V-shape.

5. The temperature monitoring assembly according to claim 4, wherein the V-shaped section extends in the space between two windings of the motor.

6. The temperature monitoring assembly according to claim 1, wherein a heat conducting film covers the at least one temperature sensor is arranged between the temperature sensor and the second component section of the heat conducting component.

7. An electric motor with the windings, which is equipped with at least one temperature monitoring assembly according to claim 1.

8. The electric motor according to claim 7, wherein the at least one temperature sensor is mounted spaced from the windings on a conductive plate or a sensor mount, and the heat conducting component is arranged with its first component section between the windings and with its second component section above the temperature sensor.

* * * * *

UNITED STATES PATENT AND TRADEMARK OFFICE
CERTIFICATE OF CORRECTION

PATENT NO.        : 10,270,317 B2
APPLICATION NO.   : 15/154079
DATED             : April 23, 2019
INVENTOR(S)       : Stefan Deubler et al.

It is certified that error appears in the above-identified patent and that said Letters Patent is hereby corrected as shown below:

In the Claims

<u>Column 6</u>
Line 25, Claim 2    "W(m K)." should be --W/(m K).--.

Signed and Sealed this
Second Day of July, 2019

Andrei Iancu
*Director of the United States Patent and Trademark Office*